Patented Oct. 22, 1935

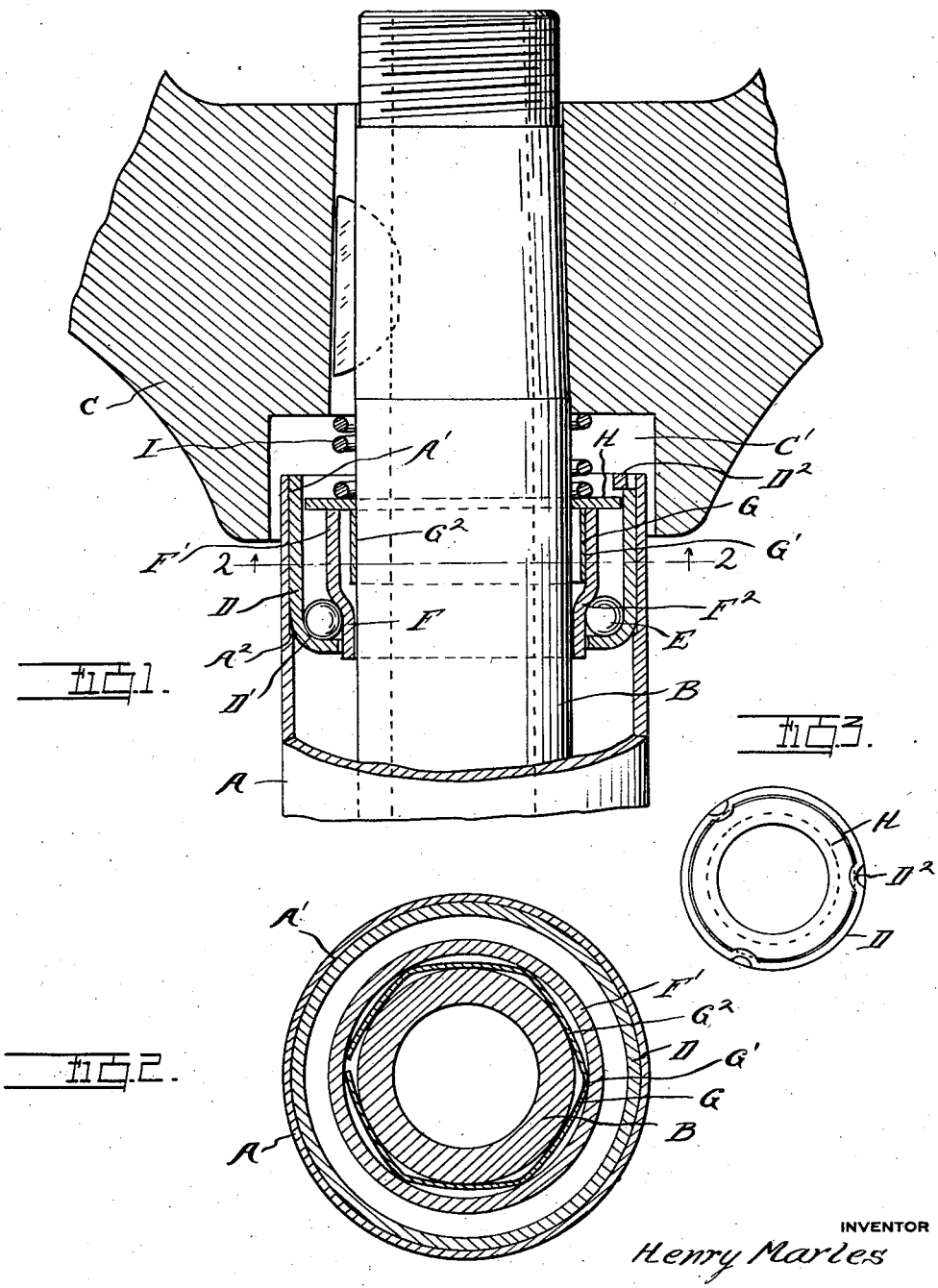

2,018,027

UNITED STATES PATENT OFFICE 2,018,027

SELF ADJUSTABLE ANTIFRICTION BEARING

Henry Marles, Detroit, Mich., assignor to Gemmer Manufacturing Company, Detroit, Mich., a corporation of Michigan Application July 9, 1934, Serial No. 734,409

6 Claims. (Cl. 308—197)

The invention relates to bearings for centering the steering stem of a motor vehicle in the upper end of the steering post and it is the object of the invention to obtain a construction of antifriction bearing which is suitable for this purpose. To this end the invention consists in the construction as hereinafter set forth.

In the drawing:

Fig. 1 is a vertical central section through the upper end of a steering post showing the steering stem and the hub of the steering wheel, and also showing my improved anti-friction bearing applied thereto;

Fig. 2 is a cross section on line 2—2, Fig. 1;

Fig. 3 is a plan view of the assembled bearing detached from the post and stem.

In the manufacture of motor vehicle steering mechanisms it is usual to form both the steering stem and the post through which it passes of drawn tubing. Such material as commercially produced is not held to close dimensions so that the diameters of both inner and outer tubes may vary to produce a corresponding variation in the annular space therebetween. Because of such variations, it is difficult to design any standard form of bushing or bearing which will fit all constructions. It is also desirable to prevent any lost motion of the steering stem in the bushing or bearing and to automatically compensate for any wear that may take place during use. My improved construction of anti-friction bearing is one which is designed to meet these conditions and which at the same time is simple and inexpensive to manufacture and which will automatically adjust itself to fit any construction.

As shown in Fig. 1, A is the outer tube or steering post, B is the inner tube constituting the steering stem and C is the hub of the steering wheel mounted on the latter tube. This hub C has a recess C' therein in which the upper end of the post A extends, there being sufficient clearance surrounding said post to accommodate any variation in the dimension thereof. My improved anti-friction bearing comprises a cupped member D forming at its lower end a race D' for balls E. The outer diameter of this cup D is equal to the maximum inner diameter of the post A and the upper end portion of this post is internally machined at A' to correspond to the diameter of the cup. Thus there is always a press fit engagement between the cup and the post, and the shoulder A² formed at the lower end of the machining constitutes a stop for locating the cup in the post. The inner race for the balls D is formed of a tubular member F which is of an inner diameter greater than the maximum outer diameter of the stem B. This tube has an expanded portion F" at its upper end which is of a still greater diameter and between this portion and the lower portion is a tapered portion F² which constitutes the ball race. For holding the tube F normally concentric with the stem B and for also forming a resilient cushion therebetween, there is inserted in the upper expanded portion F" a resilient spacer G. This is preferably formed of a polygonal resilient strip, the outer angular portions G' of which bear against the inner surface of the portion F", and the inner sides of the strips between angles bear against the stem B at points G². In normal form the spacer G has a radial dimension between the points G, G', G² which is greater than the space between the tubes A and B so that in placing the spacer between said tubes the polygonal sides thereof are bent and placed under tension.

To form a complete assembly of the bearing which may be inserted as a unit into engagement with the post and stem, balls E are placed in the cup D, the tube F inserted to form the inner race for said balls and the spacer G is placed within the portion F" of the tube F. An annular member H is then placed over the members F and G within the cup D and is held from disengagement by striking inward portions D² from the cup at spaced points therearound. The bearing is then placed within the post so as to surround the tube B this causing the expansion and tensioning of the spacer G. A coil spring I is then sleeved around the stem B and placed with its lower end abutting against the annular member G and its upper end against the top of the recess C' in the hub C.

The construction as just described will fit all steering gear posts and stems as commercially produced for the surface A' is machined to exact size and any variation in the external diameter of the stem B is compensated for by the resilient spacer G. The spring I holds the members H and F downward with sufficient tension to normally hold the race F² in contact with the balls and the latter against the race D'. If, however, there should be any tendency to bind, the spring I will yield to permit freedom for the balls. Thus it is not necessary to form the bearing with ground races which are exactly formed, as the spring I will compensate for any inaccuracies.

What I claim as my invention is:

1. An anti-friction bearing for steering stems in steering posts comprising a cupped race member of an external dimension not less than the maximum internal dimension of the steering post and having a press fit with a machined internal surface on the latter, an inner tubular race member having an internal dimension which is not less than the maximum external dimension of the steering stem and also provided with a portion of larger internal diameter, with a tapering portion between the portions of larger and smaller diameters, balls between said race members engaging the tapering portion of the inner race member, a resilient spacer arranged between the stem and said enlarged portion, and resilient means for holding said race members in contact with the balls.

2. An anti-friction bearing for steering stems in steering posts comprising a cupped race member of an external dimension not less than the maximum internal dimension of the steering post and having a press fit with a machined internal surface on the latter, an inner tubular race member having an internal dimension which is not less than the maximum external dimension of the steering stem and also provided with a portion of larger internal diameter, with a tapering portion between the portions of larger and smaller diameters, balls between said race members engaging the tapering portion of the inner race member, a resilient spacer arranged between the stem and said enlarged portion, a hub on said steering stem recessed to receive the upper end of said post and a coil spring sleeved on said stem between the inner race member and said hub for holding the former in contact with the balls and the balls in contact with the outer race member.

3. An anti-friction bearing for steering stems in steering posts comprising a cupped race member of an external dimension not less than the maximum internal dimension of the steering post and having a press fit with a machined internal surface on the latter, an inner tubular race member having an internal dimension which is not less than the maximum external dimension of the steering stem and also provided with a portion of larger internal diameter, with a tapering portion between the portions of larger and smaller diameter, balls between said race members engaging the tapering portion of the inner race member, a resilient spacer between the stem and said portion of larger internal diameter formed of a polygonal strip of resilient material deflected from normal position to be placed under tension, an annular member above said inner race member and resilient spacer and a coil spring sleeved on said stem bearing against said annular member and having its upper end bearing against the hub of the steering wheel.

4. An anti-friction bearing for steering stems in steering posts comprising a cupped race member of an external dimension not less than the maximum internal dimension of the steering post and having a press fit with a machined internal surface on the latter, an inner tubular race member having an internal dimension which is not less than the maximum external dimension of the steering stem and also provided with a portion of larger internal diameter, with a tapering portion between the portions of larger and smaller diameter, balls between said race members engaging the tapering portion of the inner race member, a resilient spacer between the steering stem and said portion of larger internal diameter comprising a polygonal strip of resilient material, an annular member surrounding said stem above said inner race member and within said outer cupped race member, struck-in portions on said cupped race member for holding said annular member from disengagement, and a coil spring surrounding said stem for yieldably holding said inner race member in contact with said balls and the latter with the outer race members.

5. An anti-friction bearing for steering stems in steering posts comprising a cupped race member having an external diameter not less than the maximum internal diameter of the post, an inner race member having a portion of an internal diameter not less than the maximum external diameter of the steering stem and also having a portion of greater internal diameter with a tapering portion between the aforesaid portions, balls between said race members engaging the tapering portion of said inner race member, a resilient bushing formed of a polygonal strip arranged within said portion of the inner race member which is of greater internal diameter and an annular member above said inner race member and resilient spacer and within said outer cupped race member, said annular member being locked from disengagement by struck-in portions on said cupped race member.

6. An anti-friction bearing for steering stems in steering posts comprising a cupped race member fitting within the post, an inner race member having a portion of an internal diameter not less than the maximum external diameter of the steering stem, an adjacent portion of greater internal diameter and a tapering portion between the aforesaid portions, balls between said race members engaging the tapering portion of the inner race member, a resilient bushing formed of a polygonal strip arranged within said portion of the inner race member which is of greater internal diameter, an annular member above said inner race member and resilient spacer and within said outer cupped race member, struck-in portions on said cupped race member for holding said annular member from disengagement, a steering wheel mounted on said steering stem and a helical spring surrounding said steering stem between said wheel and annular member and maintaining a predetermined tension against the latter for taking up all lost motion between said race members and balls.

HENRY MARLES